United States Patent [19]
Yoshida et al.

[11] Patent Number: 5,446,099
[45] Date of Patent: Aug. 29, 1995

[54] THERMOSETTING RESIN COMPOSITION

[75] Inventors: Masaya Yoshida, Takatsuki; Nobuhisa Noda; Ichiro Namura, both of Suita; Kiyoshi Kawamura, Kawanishi, all of Japan

[73] Assignee: Nippon Shokubai Co., Ltd., Osaka, Japan

[21] Appl. No.: 327,285

[22] Filed: Oct. 21, 1994

[30] Foreign Application Priority Data

Oct. 22, 1993 [JP] Japan .................. 5-265170
Feb. 10, 1994 [JP] Japan .................. 6-016302

[51] Int. Cl.$^6$ .............. C09D 139/04; C09D 135/00; C08L 39/04; C08L 35/00
[52] U.S. Cl. ................... 525/204; 525/207; 526/260
[58] Field of Search ............... 525/204, 207; 526/260

[56] References Cited

U.S. PATENT DOCUMENTS 3,509,235  4/1970  Riemhofer et al. .
3,692,757  9/1972  Dowbenko .................. 526/260
4,247,671  1/1981  Reitz ....................... 526/260
4,460,029  7/1984  Schuetz et al. .............. 152/359
5,300,602  4/1994  Arita et al. ................. 526/260

FOREIGN PATENT DOCUMENTS 3-287650  12/1991  Japan .
025361    2/1993   Japan .................. 525/204

Primary Examiner—David Buttner
Attorney, Agent, or Firm—Oblon, Spivak, McClelland, Maier & Neustadt

[57] ABSTRACT

The thermosetting resin composition of the present invention comprises: a polymer (A) containing at least one monomer selected from ethylenically unsaturated dicarboxylic anhydride, mono-ester thereof and mono-amide thereof as a repeating unit; and a polymer (B) containing an addition-polymerizable oxazoline and a hydroxyl group-containing monomer as repeating units, which can rapidly form a cured film excellent in acid rain resistance and other properties at relatively low temperature of 70° to 140° C. The further incorporation of a basic compound (C) and/or a compound (D) selected from the group consisting of a monohydric alcohol, a β-diketone and an ortho-carboxylic ester to this thermosciting resin composition can give a remarkably improved storage stability to this resin composition as a one-part type composition. This thermosciting resin composition can exhibit excellent properties as a top clear coating for motor vehicle.

12 Claims, No Drawings

THERMOSETTING RESIN COMPOSITION

FIELD OF INVENTION

The present invention relates to a one-part type thermosetting resin composition having excellent acid rain resistance, weather resistance, scratch resistance, water resistance, solvent resistance, film appearance, adhesion to a substrate to be coated and storage stability and being capable of forming a cured film at relatively low temperature, particularly useful as a composition for top coating of outer plate for motor vehicle.

BACKGROUND OF THE INVENTION

As the top coating resin composition for motor vehicle, there have been widely used acrylic-melamine resins and polyester-melamine resins in a one-part type form due to their ability to form a film having excellent resistance against weather, chemicals and solvents, high gloss and excellent appearance. flowever, it is known that acid rain caused by air-polluting substances such as sulfur oxides and nitrogen oxides, which has become a problem on a global scale, causes stains and cracks on the melamine resin-based top coating film formed on outer plates for motor vehicle. Such poor resistance of the top coating film against acid rain as described above is considered to be caused by the triazine ring in melamine resins. Therefore, so long as melamine resins are used, this defect would appear.

On the other hand, urethane-based coatings, in which polyisocyanate compound is used as a crosslinking agent, have excellent resistance against acid rain; however they have such a defect that the coating process is complicated since they are two-part type of compositions. The use of blocked polyisocyanate compound as a crosslinking agent would enable to make the urethane-based coatings into one-part type. However, the dissociation temperature of the blocking agent is high and, therefore, the film could not be cured sufficiently at the baking temperature (140°-150° C.) of the coating line currently employed.

A resin composition comprising a carboxyl group-containing resin and an epoxy group-containing resin and a resin composition additionally containing a melamine resin have also be known as coatings. These coatings can improve the acid rain resistance of the coating film to some extent. However, the introduction of a great amount of carboxyl groups and epoxy groups into these compositions for the more improvement in acid rain resistance and solvent resistance causes the lowering of compatibility between the carboxyl group-containing resin and the epoxy group-containing resin, as well as the deterioration of storage stability of the coatings due to the high reactivity between epoxy group and carboxyl group: which are practically disadvantageous.

The thermosetting resin composition has also been proposed which comprises resin containing epoxy group and hydroxyl group and resin containing mono-ester of acid anhydride group (see Japanese Patent Application Laid-open No. 287650/1991). Although this composition can solve the defect described above to some extent and shows an excellent coating property, it is required to be more improved in storage stability, acid rain resistance, water resistance, weather resistance, curability at low temperature.

In the specification of U.S. Pat. No. 3,509,235, a preparation method of a closslinked resin at low temperature by the combination of an oxazolinyl group-containing polymer and a carboxyl group-containing polymer has been disclosed. However, due to the high reactivity between oxazolinyl group and carboxyl group, the storage stability as a one-part type thermosetting resin composition is not good. Therefore, this resin has been used for a two-part type resin composition industrially, but the process for preparation of the coating is disadvantageously complicated similarly to the urethane-based coatings.

Under these circumstances, the present invention has been developed for solving the problems described above. That is, the object of the present invention is to provide a one-part type thermosetting resin composition which has excellent resistance against acid rain, weather, scratch, water and solvents, excellent film appearance and excellent adhesion to a substrate to be coated, and not only can give storage stability but also can form a cured film at relatively low temperature.

DISCLOSURE OF THE INVENTION

The thermosetting resin composition of the present invention is comprised of:

a polymer (A) containing at least one kind of monomer (a) selected from the group consisting of ethylenically unsaturated dicarboxylic anhydride, mono-ester thereof and mono-amide thereof as the essential repeating unit; and a polymer (B) containing addition-polymerizable oxazoline (b-1) represented by the following general formula (I) and hydroxyl group-containing monomer (b-2) as essential repeating units:

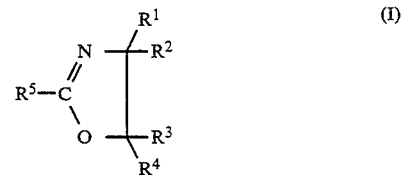

wherein $R^1$, $R^2$, $R^3$ and $R^4$ are independently hydrogen halogen alkyl, aralkyl, cycloalkyl, aryl or substituted aryl; and $R^5$ is alkenyl or cycloalkenyl.

The thermosetting resin composition exhibits a remarkably improved storage stability as a one-part type composition when further containing a basic compound (C) and/or a compound (D) which is at least one kind of compound selected from the group consisting of monohydric alcohol, $\beta$-diketone represented by the following general formula (II) and ortho-carboxylic ester:

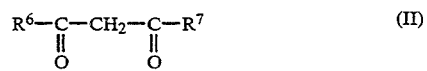

wherein $R^6$ and $R^7$ are independently alkyl or aryl.

The polymer (A) is preferably a polymer which has an acid value of 50 to 200 mg KOH/g when all of the acid anhydride groups in the polymer (A) are monoesterified from the viewpoint of the reactivity with the polymer (B).

The thermosetting resin composition of the present invention preferably contains the polymer (A) and the polymer (B) in such amounts that the equivalent of oxazolinyl groups in the polymer (B) becomes 0.3 to 2.0 based on 1.0 equivalent of all of the carboxyl groups existent in the polymer (A) when all of the acid anhydride groups in the polymer (A) are monoesterified.

The polymer (A) to be used in the present invention is produced by polymerizing an ethylenically unsaturated dicarboxylic anhydride and then monoestrifying or monoamidating a part or all of the acid anhydride groups in the resultant polymer, or by polymerizing a monomer of ethylenically unsaturated dicarboxylic anhydride in which a part or all of the acid anhydride groups are monoesterified or monoamidated.

The polymer (A) is preferably a copolymer of the monomer (a) with at least one kind of alkyl (meth)acrylate and/or styrene, from the viewpoint of properties of the coating film.

The monomer (a) described above is preferably at least one kind of monomer selected from the group consisting of dicarboxylic anhydride selected from maleic anhydride, itaconic anhydride and citraconic anhydride, mono-ester thereof and monoamide thereof.

On the other hand, the polymer (B) of the present invention preferably contains the addition-polymerizable oxazoline (b-1) and the hydroxy group-containing monomer (b-2) as the essential repeating units in such amounts that the equivalent of the hydroxy group becomes 0.5 to 2.0 based on 1 equivalent of the oxazolinyl groups in the polymer (B).

The polymer (B) is preferably a copolymer of the addition-polymerizable oxazoline (b-1) and the hydroxyl group-containing monomer (b-2) with at least one kind of alkyl (meth)acrylate and/or styrene, from the viewpoint of properties of the coating film. It is further preferable that the hydroxyl group-containing monomer (b-2) is a (meth)acrylate containing hydroxyl group.

In the case where the thermosetting resin composition of the present invention further contains the basic compound (C), it is preferable that the basic compound (C) is an amine compound and added to the composition in an amount of 0.3 to 3.0 equivalent based on 1.0 equivalent of all of the carboxyl groups existent in the composition when all of the acid anhydride groups in the polymer (A) are monoesterified. In the case where the compound (D), which is at least one compound selected from the group consisting of monohydric alcohol, β-diketone represented by the general formula (II) indicated above and ortho-carboxylic ester, the compound (D) is preferably contained in the composition in an amount of not less than 1.0 equivalent based on 1.0 equivalent of all carboxyl groups existent in the composition when all of the acid anhydride groups of the polymer (A) are monoesterified.

The thermosetting resin composition of the present invention is especially useful as a top coating composition for motor vehicle outer plate.

BEST MODE FOR CARRYING OUT THE INVENTION

The thermosetting resin composition of the present invention contains a polymer (A) and a polymer (B) as the essential components. Hereinafter, the term "polymer" means not only homopolymer but also copolymer employed plurally, at least two kinds of monomers.

The polymer (A) contains at least one kind of monomer (a) selected from the group consisting of ethylenically unsaturated dicarboxylic anhydride, mono-ester thereof and mono-amide thereof as the essential repeating unit.

The polymer (A) can be prepared by polymerizing a monomer component containing at least one kind of the monomer (a) described above or by polymerizing a monomer component containing only ethylenically unsaturated dicarboxylic anhydride as the essential component and, during or after the polymerization process, monoesterifying or monoamidating a part or all of the unsaturated dicarboxylic anhydride groups in the resultant polymer.

As the monomer (a) to be used, there can be employed, for example, an ethylenically unsaturated dicarboxylic anhydride such as itaconic anhydride, maleic anhydride and citraconic anhydride, a mono-ester thereof and a mono-amide thereof.

The monoesterification of the acid anhydride groups of the polymer (A) during or after the polymerization process can be achieved by reacting with a monoesterifying agent. Examples of the monoesterifying agent include low molecular weight alcohols such as methanol, ethanol, i-propanol, t-butanol, i-butanol, methyl cellosolve, dimethylaminoethanol, diethylaminoethanol, acetol and so on. A monoamidating agent can also be used for monoamidating. Examples of the monoamidating agent include low molecular weight amines such as monoethylamine, monobutylamine, diethylamine, aniline and so on.

Among these compounds indicated above, especially preferable are methanol, n-butanol, dimethylaminoethanol, diethylaminoethanol and acetol.

The monoesterification or monoamidation reaction is carried out according to the conventional method at the temperature within the range from room temperature to 120° C., and a tertiary amine is optionally used in the reaction as a catalyst. When the reaction is carried out during the polymerization process of the polymer (A), the monoesterifying agent or monoamidating agent described above may be added to a solvent for polymerization in the required amount to lead the ring-opening of a part or all of the acid anhydride groups; whereby the monoesterification or monoamidation is accomplished.

In the present invention, it is important that the polymer (A) should contain the monomer (a) described above as the essential repeating unit. In the case where all of the acid anhydride groups in the polymer (A) are subjected to, for example, the monoesterification process, the monomer (a) is preferably polymerized so that the acid value, which is a value indicating the amount of all of carboxyl groups in the polymer (A), becomes 50 to 200 mg KOH/g. If the acid value is smaller than 50 mg KOH/g, the coating film would show an insufficient crosslinking density, resulting in extremely poor solvent resistance, acid rain resistance and weather resistance. On the other hand, if the acid value is over 200 mg KOH/g, the resultant composition would exhibit poor storage stability or would not be applicable for the use where water resistance is required.

in the preparation of the polymer (A), besides the monomer (a) as the essential component, a monomer component containing other monomers (a-2) may also be radical-polymerized for the purpose of improvement in properties of the coating film. The amount of the other monomers (a-2) to be employed is appropriately determined so that the acid value of the polymer (A) lays within the preferable range described above. Specific examples of the other monomers (a-2) include styrene derivatives such as styrene, vinyltoluene, a-methylstyrene, chloromethylstyrene, styrenesulfonic acid and a salt thereof; (meth)acrylamide derivatives such as (meth)acrylamide, N-monomethyl(meth)acrylamide, N-monoethyl(meth)acrylamide and N,N-dimethyl(meth)acrylamide; carboxyl group-containing monomers such as (meth)acrylic acid and itaconic acid; alkyl (meth)acrylates synthesized by esterification of (meth)acrylic acid with $C_1$–$C_{18}$ alcohols such as methyl (meth)acrylate, ethyl (meth)acrylate, butyl (meth)acrylate and cyclohexyl (meth)acrylate; olefins such as ethylene, propylene and n-butene; unsaturated sulfonates such as 2-sulfonylethyl (meth)acrylate, a salt thereof, vinylsulfonate and a salt thereof; vinyl esters such as vinyl acetate, vinyl propionate and vinyl stearate; (meth)acrylonitrile; vinyl ethers such as methyl vinyl ether, ethyl vinyl ether, octyl vinyl ether and lauryl vinyl ether; basic monomers such as dimethylaminoethyl (meth)acrylate, dimethylaminoethyl (meth)acrylamide, dimethylaminopropyl (meth)acrylamide, vinylpyridine, vinylimidazole and vinylpyrrolidone; polyfunctional (meth)acrylates containing at last two polymeric unsaturated groups per molecule such as esters of (meth)acrylic acid with polyhydric alcohols such as ethylene glycol, 1,3-butylene glycol, diethylene glycol, 1,6-hexane glycol, neopentyl glycol, poly(ethylene glycol), poly(propylene glycol), trimethyrolpropane, pentaerythritol and dipentaerythritol; (meth)acrylamides such as N-methylol (meth)acrylamide and N-butoxy (meth)acrylamide; epoxy group-containing monomers such as glycidyl (meth)acrylate, 2-methylglycidyl (meth)acrylate and allyl glycidyl ether; polymerizable UV-stable monomers such as 4-(meth)acryloyloxy-1, 2,2,6,6-pentamethylpiperidine and 4-(meth)acryloylamino-1,2,2,6,6-pentamethylpiperidine; and vinyl fluoride, vinylidene fluoride, vinyl chloride, vinylidene chloride, divinylbenzene, diallyl terephthalate, and so on. These compound may be used alone or in combination thereof simultaneously with the monomer (a). Among these, especially preferable are alkyl (meth)acrylates such as methyl (meth)acrylate, ethyl (meth)acrylate, butyl (meth)acrylate and cyclohexyl (meth)acrylate. In the case where good appearance of the coating film is required, styrene is preferably used, and in the case where superior weather resistance of the coating film is required, polymerizable UV-stable monomers such as 4-(meth)-acryloyloxy-1,2,2,6,6-pentamethylpiperidine and 4-(meth)acryloylamino-1,2,2,6,6-pentamethylpiperdine is preferably used. In addition, when maleic anhydride is used as the monomer (a), it is preferable to use the styrene with the alkyl (meth)acrylate since maleic anhydride is hard to be copolymerized with alkyl (meth)acrylate.

The polymer (B) is a polymer containing addition-polymerizable oxazoline (b-1) represented by the following general formula (I) and hydroxyl group-containing monomer (b-2) as the essential repeating units.

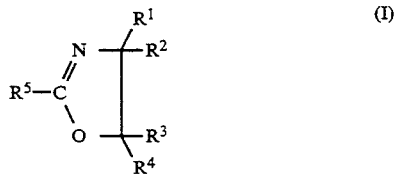

wherein $R^1$, $R^2$, $R^3$ and $R^4$ are independently hydrogen halogen alkyl, aralkyl, cycloalkyl, aryl or substituted aryl, and $R^5$ is alkenyl or cycloalkenyl.

That is, the polymer (B) can be prepared by the radical polymerization of a monomer component containing the addition-polymerizable oxazolinyl (b-1) and the hydroxyl group-containing monomer (b-2) as the essential components.

The addition-polymerizable oxazoline (b-1) represented by the general formula (I) shown above is a monomer in which the radical addition polymerization is carried out at the $R^5$ position and is used for the introduction of oxazoline ring, i.e. oxazolinyl group, into the polymer (B).

Specific examples of the addition-polymerizable oxazoline (b-1) include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline and 2-isopropenyl-5-ethyl-2-oxazoline. These compounds may be used alone or in a mixture of two or more of them.

Specific examples of the hydroxyl group-containing monomer (b-2), which is another essential constituent of the polymer (B), include 2-hydroxyethyl (meth)acrylate, 2-hydroxypropyl (meth)acrylate, 1- methyl-2-hydroxyethyl (meth)acrylate, 3-hydroxypropyl (meth)acrylate, 4-hydroxybutyl (meth)acrylate, caprolactone-modified (meth)acrylate (e.g. "Placcel FM and FA series" commercially available from Daicel Chemical Industries, Ltd.), mono(meth)acrylate of polyester diol prepared from phthalic acid and propylene glycol, and hydroxyl group-containing (meth)acrylates such as adducts of unsaturated carboxylic acids such as (meth)acrylic acid and maleic acid and monoepoxide compounds (e.g. "Cardular E" commercially available from Yuka Shell Epoxy Kabushiki Kaisha; a glycidyl ester of a branched aliphatic monocarboxylic acid).

In the preparation of the polymer (B), similarly to the preparation of the polymer (A), it is preferable that the addition-polymerizable oxazoline (b-1) and the hydroxyl group-containing monomers (b-2) are radically polymerized with other monomers (b-3). As the other monomers (b-3) to be used, there can also be employed the monomers exemplified in the above as "the other monomers (a-2)" constituting the polymer (A). Among these, preferably employed for the polymer (B) are alkyl (meth)acrylates such as methyl (meth)acrylate, ethyl (meth)acrylate, butyl (meth)acrylate and cyclohexyl (meth)acrylate; styrene; polymerizable UV-stable monomers such as 4-(meth)-acryloyloxy-1,2,2,6,6-pentmethylpiperidine and 4-(meth)acryloyl-amino-1,2,2,6,6-pentamethylpiperidine; and so on.

The constitutional ratio of the addition-polymerizable oxazoline (b-1) and the hydroxyl group-containing monomer (b-2) is not particularly limited, but is preferably adjusted so that the equivalent of the hydroxyl groups shows 0.5 to 2.0 based on 1.0 equivalent of the oxazolinyl groups in the polymer (B).

In the preparation of the polymers (A) and (B), a conventional radical polymerization method is employed, such as solution polymerization, bulk polymerization, suspension polymerization, emulsion polymerization and so on. As the solvents to be used for the solution polymerization, there can be employed, for example, aromatic hydrocarbons such as toluene, xylene and "Solvesso #100" (a product commercially available from Esso Corporation); acetates such as ethyl acetate, butyl acetate and isobutyl acetate; ketones such as methyl ethyl ketone; ethers of alkylene glycols such as propylene glycol mono methyl ether acetate, dipropylene glycol mono methyl ether acetate and diethylene glycol mono methyl ether acetate; alcohols such as methyl alcohol, butyl alcohol, isopropyl alcohol, propylene glycol mono methyl ether, dipropylene glycol mono methyl ether and ethylene glycol; and so on. These solvents may be used alone or as the mixtures of two or more of them. The polymerization initiator to be employed is a conventional radical polymerization initiator, such as an azo-based compound (e.g. azobisisobutyronitrile, azobis(2- methyl)butyronitrile, etc.); a peroxide (e.g. benzoylperoxide, di(tertiary-butyl)peroxide, etc.); and so on. The initiator is used in the amount within the range from 0.1 to 10 wt % based on the total amount of the monomers. The reaction temperature for the polymerization to be employed is within the range from room temperature to 200° C., preferably from 40 to 150° C. In the polymerization reaction, for the purpose of adjusting the number average molecular weight of the resultant polymer, a chain transfer agent may be used such as lauryl mercaptan, 2- mercaptoethanol and carbon tetrachloride.

The one-part type thermosetting resin composition comprising the polymers (A) and (B) of the present invention exhibits the following curing behavior:

First, ester groups (or amide groups) and carboxyl groups given by the monoesterification (or monoamidation) of acid anhydride groups in the polymer (A) are caused the ring-closure therebetween again at the curing temperature (70° to 140° C.) to be reverted once to the original acid anhydride groups. Then, these acid anhydride groups in the polymer (A) are reacted with the hydroxyl groups in the polymer (B) to be monoesterified, resulting in reformation of ester groups and carboxyl groups. The carboxyl groups thus produced are reacted with the oxazolinyl groups in the polymer (B). The curing reaction thus proceeds rapidly. That is, this curing reaction proceeds by reacting the dicarboxylic anhydride groups in the polymer (A) with the two kinds of functional groups, i.e. oxazolinyl groups and hydroxyl groups in the polymer (B), respectively to be combined, resulting in formation of a firm network structure. Due to this firm network structure, the resultant cured coating film can be produced with excellent weather resistance, acid rain resistance and chemical resistance.

It is preferable for the production of a coating film having excellent properties that the polymers (A) and (B) are blended with each other in such a blending ratio that the equivalents of the oxazolinyl groups and the hydroxyl groups in the polymer (B) become 0.3 to 2.0 and 0.1 to 3.0, respectively, based on 1.0 equivalent of all carboxyl groups in the polymer (A) given when all of the acid anhydride groups in the polymer (A) are monoesterified. Therefore, the thermosetting composition of this invention is prepared by appropriately blending the polymer (A) and the polymer (B) according to the above-mentioned preferable blending ratio. If the oxazolinyl groups show less than 0.3 equivalent or the hydroxyl groups show less than 0.1 equivalent based on 1.0 equivalent of all carboxyl groups in the polymer (A) given when all of the acid anhydride groups in the polymer (A) are monoesterified, the amounts of these functional groups are not substantially effective for the curing reaction through cross-linking. On the other hand, if the oxazolinyl groups show over 2.0 equivalents or the hydroxyl groups show over 3.0 equivalents based on 1.0 equivalent of all carboxyl groups in the polymer (A) given when all of the acid anhydride groups in the polymer (A) are monoesterified, the amounts of these functional groups are also not substantially effective for the curing reaction through cross-linking. It is more preferable that the equivalents of the oxazolinyl groups and the hydroxyl groups becomes 0.7 to 1.3 and 0.5 to 2.0, respectively.

In the present invention, the basic compound (C) and the compound (D) selected from the group consisting of monohydric alcohol, $\beta$-diketone represented by the general formula (II) and ortho-carboxylic ester effectively work for the improvement in storage stability of the one-part type thermosetting resin composition. That is, the basic compound (C) helps the improvement in storage stability of the composition by neutralizing the carboxyl groups in the polymer (A) and blocking them to inhibit the reaction with the oxazolinyl groups in the polymer (B). In the cross-linking reaction process, the basic compound (C) is vaporized by heating and can not inhibit the reaction any more. Specific examples of the basic compound (C) include amine compounds such as ammonia, primary amines (e.g. methylamine), secondary amines (e.g. dimethylamine), tertiary amines (e.g. triethylamine, dimethylaminoethanol and diethylhydroxyamine), aliphatic amines (e.g. n-butylamine and diethylamine), alicyclic amines(e.g. cyclohcxylamine), heterocyclic amines (e.g. piperidine, morpholine, N-methylpiperidine, N-ethylmorpholine and pyridine), aromatic amines (e.g. benzyl amine, N-methylaniline and N,N-dimethylaniline) and so on. These compounds may be used alone or in the mixtures of two or more of them.

The amount of the basic compound (C) to be employed is preferably 0.3 to 3.0 equivalents based on 1.0 equivalent of all carboxyl groups existent in the polymer (A) when all of the acid anhydride groups in the polymer (A) are monoesterified. If the amount is less than 0.3 equivalent, the resultant thermosetting resin composition would not exhibit a satisfactory storage stability. On the other hand, if the amount is over 3.0 equivalents, cross-linking curability of the resultant thermosetting resin composition and weather resistance of the coating product would be impaired. Preferably, the amount of the basic compound (C) is 0.5 to 2.0 equivalents.

On the other hand, in the case where the acid anhydride groups in the polymer (A) are ring-opened to become mono-ester groups (wherein this ring-opening monoesterification reaction is a reversible equilibrium reaction), among the compound (D), a monohydric alcohol and a $\beta$-diketone can cause the transesterification with the mono-ester groups in the polymer (A) to stabilize the mono-ester groups, whereby the occurrence of the transesterification reaction of the mono-ester groups in the polymer (A) with the hydroxyl groups in the polymer (B) can be prevented. Among the compound (D), an ortho-carboxylic ester is a dehydration agent which is reactive with water, and therefore can prevent the mono-ester groups of the polymer (A) from being hydrolyzed to become carboxyl groups. These compounds as the compound (D) can be vaporized by heating. Accordingly, the incorporation of such compound can impart the remarkably improved storage stability to the resultant one-part type thermosetting resin composition without any inhibition of the subsequent cross-linking reaction.

As the monohydric alcohol to be used, any alcohol may be employed so long as it is a low molecular weight of monohydric alcohol, such as above-mentioned alcohol as the solvents for solution polymerization and above-mentioned alcohols as alcohols utilizable for the monoesterification of acid anhydride groups. Specific examples of the monohydric alcohol include methanol, ethanol, n-butanol, i-propanol, t-butanol, i-butanol, methyl cellosolve, dimethylaminoethanol, diethylaminoethanol, acetol, propylene glycol monomethyl ether, dipropylene glycol monomethyl ether and trifluoroethanol.

As the β-diketone represented by the following general formula (II):

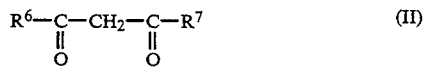

wherein $R^6$ and $R^7$ are independently alkyl or aryl, acetylacetone and ethyl acetoacetate can be employed, and additionally, the compounds having the following formulae can also be employed as the β-diketone:

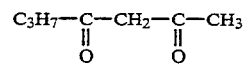

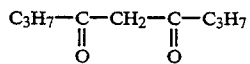

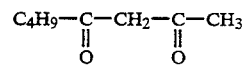

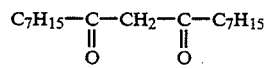

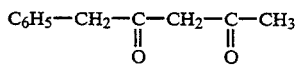

The ortho-carboxylic ester is represented by the formula $RC(OR')_3$, and specifically exemplified as methyl orthoformate, ethyl orthoformate, methyl orthoacetate, ethyl orthoacetate, and so on.

The amount of the compound (D) selected from the group consisting of monohydric alcohol, β-diketone and ortho-carboxylic ester described above is preferably not less than 1.0 equivalent based on 1.0 equivalent of all carboxyl groups existent in the polymer (A) when all of the acid anhydride groups in the polymer (A) are monoesterified. Less than 1.0 equivalent of the compound (D) would not provide a one-part type thermosetting resin composition having a sufficient storage stability.

In the case the basic compound (C) and the compound (D) described above are simultaneously used for the improvement in stability of the resultant composition, the total amount of the both compounds is preferably not less than 1.0 equivalent based on 1.0 equivalent of all carboxyl groups existent in the polymer (A) when all of the acid anhydride groups in the polymer (A) are monoesterified.

The thermosetting resin composition of the present invention contains the polymers (A) and (B) as the essential components and, if necessary, further contains the basic compound (C) and the compound (D) selected from the group consisting of monohydric alcohol, β-diketone and ortho-carboxylic ester. From the viewpoint of practical applicability as a coating composition, this composition is preferably dissolved or suspended into organic solvent and/or water. As the organic solvent to be used, those conventionally used for coatings can be employed. In addition, if necessary, other components conventionally used for coating compositions may be blended to this composition. Examples of such components include rheology controller such as organic montmorillonites, microgels, polyamides and polyethylene waxes, leveling agents such as silicone- and acrylic-oligomers, ultraviolet absorbents, ultraviolet stabilizers, amino resins, blocked polyisocyanate compounds, and so on.

The curing catalyst may also be blended to the thermosetting resin composition, such as quaternary ammonium salts or quaternary phosphonium salts. These catalysts are preferably blended in amount of 0.01 to 3 wt % based on the total weight of the polymers (A) and (B). Examples of the quaternary ammonium salt include tetra-alkylammonium halides such as tetramethylammonium chloride and tetraethylammonium chloride; tetra-alkylammonium hydroxides such as tetramethylammonium hydroxide and tetraethylammonium hydroxide; and so on. Examples of the quaternary phosphonium salt include benzyltriphenylphosphonium chloride, tetraphenylphosphonium chloride, and so on.

The thermosetting resin composition of the present invention is useful as a clear coating composition. When the thermosetting resin composition is used for clear coating, it may be blended with a small amount of pigment to be colored to such an extent that the complete hiding is not expressed. The thermosetting resin composition may also be used as a color coating composition by blending with color pigment, metallic pigment, interference pigment and the like. Specific examples of the color pigment include inorganic pigments such as titanium dioxide, iron oxide, chromium oxide, lead chromate and carbon black and organic pigments such as phthalocyanine blue and phthalocyanine green. Specific examples of the metallic pigment include aluminum flake, copper-bronze flake, mica and the like.

As the method for the application of the coating composition using the thermosetting resin composition of the present invention, any applying method can be employed such as spraying, brushing, dipping, rolling and flowing. When the resin composition of the present invention is used as a clear top coating for motor vehicle, the conventional method may be employed for applying the clear top coating, however, preferably the clear top coating is applied in such a manner that firstly a base coating is applied in such a manner that firstly a base coating is applied on a substrate and then the clear top coating is further applied on the base coating by the wet-on-wet method (i.e. a method in which a substrate applied with a base coating is dried just for several minutes, another coating is further applied on the base coating immediately and then the resultant is subjected to the baking process). Of course, the thermosetting resin composition of the present invention may be used as the above base coating for motor vehicle. The resin composition may also be used as a solid color coating. In addition, the resin composition can also be used for coil coating and coating for house-hold electric appliances, electric materials or other various articles which are required to be coated.

The thermosetting resin composition of the present invention exhibits a sufficient stability when stored as a one-part type composition. This composition can be cured to form a stiff cured film rapidly at low temperature, and the coating film exhibits excellent acid rain resistance, weather resistance, scratch resistance, water resistance and solvent resistance and has excellent appearance and adhesion to a substrate to be coated. Accordingly, the thermosetting resin composition of the present invention is usefully applicable in any field described above.

EXAMPLES

The present invention will be illustrated in more detail in the following examples; however the invention is not limited in the scope of the examples. In the examples, all percentages and parts are by weight unless otherwise specified.

Production Example 1

[Synthesis of polymer (A)]

Into a four-neck flask equipped with a stirrer, a thermometer, a condenser, a dropping funnel and a nitrogen gas inlet tube, 33.3 parts of butyl acetate and 33.3 parts of xylene were charged, and the flask was heated to 125° C. Subsequently, a mixture of 13.1 parts of maleic anhydride, 37.1 parts of methyl methacrylate, 30 parts of styrene, 19.8 parts of butyl acrylate and 1.0 part of azobis(2-methyl)butyronitrile was added dropwise to the flask through the dropping funnel over four hours with introducing nitrogen gas thereinto. The resultant was maintained at 90° C. for additional 4 hours and then cooled to room temperature; whereby a solution of a polymer (A) containing acid anhydride groups was obtained (solid content: 60.2%) (hereinafter, referred to as "polymer (A-i)").

Production Example 2

[Monoesterification reaction]

To 100 parts of the polymer (A-1) given by Production Example 1, 10 parts of methanol and 1 part of triethylamine were added, and the mixture was reacted at 60° C. for two hours. When the resultant reaction product was determined for its infrared adsorption spectrum, the adsorption of acid anhydride group (1785 cm$^{-1}$) disappeared, which showed that all of the acid anhydride groups in the reaction product had been monoesterified. The monoesterified polymer thus prepared was referred to as "polymer (A-2)".

Production Example 3

[Monoamidation reaction]

To 100 parts of the polymer (A-i) given by Production Example 1, 12 parts of diethylamine was added, and the mixture was reacted at 60° C. for two hours. When the resultant reaction product was determined for its infrared adsorption spectrum, the adsorption of acid anhydride group (1785 cm$^{-1}$) disappeared, which showed that all of the acid anhydride groups in the reaction product had been monoamidated. The monoamidated polymer thus prepared was referred to as "polymer (A-3)"

Production Example 4

[Monoamidation reaction]

To 100 parts of the polymer (A-i) given by Production Example 1, 12 parts of dimethylaminoethanol was added, and the mixture was reacted at 60° C. for two hours. When the resultant reaction product was determined for its infrared adsorption spectrum, the adsorption of acid anhydride group (1785 cm$^{-1}$) disappeared, which showed that all of the acid anhydride groups in the reaction product had been monoamidated. The monoamidated polymer thus prepared was referred to as "polymer (A-4)"

Production Examples 5 to 7

[Synthesis of polymer (A)]

The procedure of Production Example 1 was repeated except employing the monomer components and solvent components indicated in Table 1; whereby solutions of polymers (A-5), (A-6) and (A-7) were given.

TABLE 1

| No. of polymer (A) | P.Ex. 1 (A-1) | P.Ex. 5 (A-5) | P.Ex. 6 (A-6) | P.Ex. 7 (A-7) |
|---|---|---|---|---|
| Monomers (parts) | | | | |
| Maleic anhydride | 13.1 | | 8.7 | 40.0 |
| Monomethyl itaconate | | 28.2 | | |
| Styrene | 30.0 | | 20.0 | 35.0 |
| Methyl methacrylate | 37.1 | 16.8 | 41.3 | 15.0 |
| Butyl methacrylate | | 30.0 | 10.0 | |
| Butyl acrylate | 19.8 | 25.0 | 20.0 | 10.0 |
| Solvents (parts) | | | | |
| Butyl acetate | 33.3 | 33.3 | 33.3 | 33.3 |
| Xylene | 33.3 | 33.3 | 23.3 | 33.3 |
| n-Butanol | | | 10.0 | |
| Azobis(2-methyl)butyronitrile (parts) | 3.0 | 3.0 | 3.0 | 3.5 |
| Solid content (%) | 60.2 | 60.0 | 60.1 | 59.9 |

Production Example 8

[Synthesis of polymer (B)]

Into a four-neck flask equipped with a stirrer, a thermometer, a condenser, a dropping funnel and a nitrogen gas inlet tube, 33.3 parts of butyl acetate and 33.3 parts of n-butanol were charged, and the flask was heated to 95° C. Subsequently, a mixture of 20 parts of 2-isopropenyl-2-oxazoline, 18.7 parts of methyl methacrylate, 41.8 parts of butylacrylate, 19.5 parts of 2-hydroxyethyl methacrylate and 3.0 parts of t-butylperoxy(2-ethylhexanoate) (a product commercially available from Nippon Oil and Fat Company) was added dropwise to the flask through the dropping funnel over three hours with introducing nitrogen gas thereinto. The resultant was maintained at 90° C. for additional eight hours and then cooled to room temperature; whereby a solution of a polymer (B) was obtained l(so lid content: 60.2%) (hereinafter, referred to as "polymer (B-1)")

Production Examples 9 to 11 and Comparative Examples 1 to 2

[Synthesis of "polymer (B)]

The procedure of Production Example 8 was repeated except employing the monomer compositions indicated in Table 2; whereby solutions of polymers (B-2), (B-3) and (B-4) and comparative polymers (B'-1) and (B'-2) were given.

TABLE 2

| No. of polymer (B) | P.Ex. 8 (B-1) | P.Ex. 9 (B-2) | P.Ex. 10 (B-3) | P.Ex. 11 (B-4) | C.P.Ex. 1 (B'-1) | C.P.Ex. 2 (B'-2) |
|---|---|---|---|---|---|---|
| Monomers (parts) | | | | | | |
| 2-Isopropenyl-2-oxazoline | 20.0 | 40.0 | | 20.0 | | 30.0 |
| 2-Vinyl-2-oxazoline | | | 15.0 | | | |
| Glycidyl methacrylate | | | | | 25.6 | |

TABLE 2-continued

| No. of polymer (B) | P.Ex. 8 (B-1) | P.Ex. 9 (B-2) | P.Ex. 10 (B-3) | P.Ex. 11 (B-4) | C.P.Ex. 1 (B'-1) | C.P.Ex. 2 (B'-2) |
|---|---|---|---|---|---|---|
| Butyl methacrylate | | | 10.0 | | | |
| Methyl methacrylate | 18.7 | | 15.0 | | 13.1 | 23.2 |
| Butyl acrylate | 41.8 | 14.0 | 30.0 | | 41.8 | 46.8 |
| 2-Hydroxyethyl methacrylate | 19.5 | 46.0 | 30.0 | | 19.5 | |
| Placcel FM-1* | | | | 80.0 | | |
| Solvents (parts) | | | | | | |
| Butyl acetate | 33.3 | 33.3 | 33.3 | | 33.3 | 33.3 |
| Xylene | | | 33.3 | | | |
| n-Butanol | 33.3 | 33.3 | | 33.3 | 33.3 | 33.3 |
| t-Butyl peroxy(2-ethylhexanoate) (parts) | 3.0 | 3.0 | 3.0 | 3.0 | 3.0 | 3.0 |
| Solid content (%) | 60.2 | 59.8 | 60.0 | 59.7 | 60.3 | 60.0 |

*Caprolactone-modified methacrylate (a product by Daicel Chemical Industries, Ltd.)

Examples 1 to 13 and Comparative Examples 1 to 3

A polymer (A) and a polymer (B) were blended with a basic compound (C), a compound (D) selected from the group consisting of a monohydric alcohol, a β-diketone and an ortho-carboxylic ester and a solvent in the blending ratio indicated in Table 3; whereby thermosetting resin compositions (1) to (13) and comparative thermosetting resin compositions (1) to (3) were given.

The storage stability at 50° C. for 30 days of the resultant thermosetting resin compositions were examined. The results are also shown in Table 3. As a result, the thermosetting resin compositions according to the present invention were found to exhibit good storage stability. Among these, the compositions in which the basic compound (C) and the compound (D) which is one of the monohydric alcohol, the β-ketone or the ortho-carboxylic ester were simultaneously incorporated to the polymers (A) and (B) exhibited extremely excellent storage stability.

In these examples, the examination of storage stability was carried out in the following manner: A thermosetting resin composition was diluted with a mixed solvent of 50 parts of "Solvesso #100" (a thinner; commercially available from Esso Company) and 50 parts of "Solvesso #150" (a thinner; commercially available from Esso Company) so that the diluted solution showed a viscosity determined using Ford Cup #4 of 25 sec. at 20° C., and the resultant solution was stored at 50° C. for 30 days. The storage stability was judged as the degree of increase in viscosity at 20° C. determined using Ford Cup #4 according to the following four-point scale: ⊚(Excellent) : increase in viscosity of 5 sec. or less ○ (Good) : increase in viscosity of 5 to 10 sec. Δ(Fair) : increase in viscosity of 10 to 15 sec. x (Poor) : gelation being occurred during the storage

TABLE 3

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | C.Ex. 1 | C.Ex. 2 | C.Ex. 3 |
|---|---|---|---|---|---|---|---|---|---|---|---|---|---|---|---|---|
| No. of thermosetting resin composition | (1) | (2) | (3) | (4) | (5) | (6) | (7) | (8) | (9) | (10) | (11) | (12) | (13) | C.(1) | C.(2) | C.(3) |
| No. of polymer (A) | A-1 | A-2 | A-3 | A-4 | A-5 | A-6 | A-1 | A-1 | A-1 | A-7 | A-1 | A-1 | A-1 | A-1 | A-1 | A-1 |
| (parts) | 50.0 | 53.0 | 53.0 | 53.0 | 50.0 | 50.0 | 50.0 | 50.0 | 50.0 | 50.0 | 50.0 | 50.0 | 50.0 | 50.0 | 50.0 | 53.0 |
| No. of polymer (B) | B-1 | B-1 | B-1 | B-1 | B-1 | B-1 | B-2 | B-3 | B-4 | B-1 | B-1 | B-3 | B-3 | B'-1 | B'-2 | B'-1 |
| (parts) | 37.5 | 37.5 | 37.5 | 37.5 | 44.01 | 31.2 | 18.8 | 43.0 | 37.1 | 112.5 | 37.51 | 43.0 | 43.0 | 37.5 | 25.0 | 37.5 |
| Compound (C) (parts) | | | | | | | | | | | | | | | | |
| Triethylamine | 4.1 | 4.1 | | | | | 4.1 | 4.1 | | | | 4.1 | | | 4.1 | |
| Dimethylaminoethanol | | | 1.5 | 1.5 | 6.3 | 1.9 | | | 3.0 | 10.9 | | | | | | |
| Compound (D) (parts) | | | | | | | | | | | | | | | | |
| Methanol | 5.0 | 2.0 | | 2.0 | | | 4.5 | 5.0 | 5.0 | 9.1 | | | | | | |
| Acetol | | | | | 4.0 | 3.0 | | | | | | | | | | |
| Trimethyl orthoformate | | | 2.0 | | | | | | | | | | | | | |
| Propylene glycol monoethyl ether (parts) | 8.4 | 8.4 | | | 8.5 | 14.3 | 6.7 | 10.0 | | 16.6 | 8.4 | | | 17.5 | 10.9 | 13.5 |
| Propylene glycol monoethyl ether acetate (parts) | | | 8.4 | 8.4 | | | | | | | | 14.5 | 18.6 | | | |
| Storage stability | ⊚ | ⊚ | ⊚ | ⊚ | ⊚ | ⊚ | ⊚ | ⊚ | ⊚ | ○ | Δ | Δ | Δ-X | X | ○ | X |

Examples 14 to 20 and Comparative Example 4

The thermosetting resin compositions (1) to (3), (5), (9) and (10) and the comparative thermosetting resin composition (1) given by Examples 1 to 3, 5, 9 and 10 and Comparative Example 1, respectively, were selected as samples to be examined. To each of these compositions, "BYK-300" (a leveling agent; commercially available from BYK-Chemie Japan K.K.) and "Tinuvin 900" (an ultraviolet absorbent; commercially available from Ciba-Geigy Japan Limited) were added in amounts of 0.1 wt % and 2.0 wt %, respectively, based on the solid content of the resin, and the mixture was stirred using a stirrer. Subsequently, the resultant was diluted with a mixed solvent of 50 parts of "Solvesso #100" (a thinner; commercially available from Esso Corporation) and 50 parts of "Solvesso #150" (a thinner; commercially available from Esso Corporation) so that the diluted solution showed a viscosity determined using Ford Cup #4 of 25 sec. at 20° C.; whereby a clear coating was obtained.

On a mild steel plate [JIS G-3141 (SPCC-SB)] which had been treated with zinc phosphate and then subjected to electrodepositing process and intermediate coating process, a metallic coating described below was applied (the cured film thickness: 20 μm). Just after allowing stand at room temperature for five minutes, the clear coating prepared in the above was applied on the metallic coating (by the wet-on-wet method; the cured film thickness: 40 μm), and then heated at 140° C. for 20 minutes to prepare a film to be examined. The results of the examinations for various properties of the film are shown in Table 4.

| Composition of metallic coating: | |
|---|---|
| Acrylic resin ("Aroset 5835"; a product by Nippon Shokubai Co., Ltd.) | 100 parts |
| Butylrated melamine resin ("U-VAN 20SE-60"; a product by Mitsui Toatsu Chemicals, Inc.) | 60 parts |
| Aluminum paste ("Aluminum paste 55-519"; a product by Toyo Aluminium K.K.) | 10 parts |

For the use for the coating process described above, this metallic coating described above was diluted with a mixed solvent of 50 parts of "Solvesso #100" (a product

[Gloss]
This test was carried out by entering an incident light on a film, in which the angle of the incidence was 60, and the gloss was measured using a gloss meter (a machine produced by Nippon Denshoku Kogyo Co., Ltd.).

[Finished appearance]
The finished appearance of a coating film to be tested was judged visually.

[Weather resistance]
This property was examined by observing the condition of the surface of a film after being subjected to the sunshine weather meter for 3000 hours.

[Scratch resistance]
The Tabar's abrasion resistance test was carried out according to AST M D-1044 CS-10, in which the load was 500 g.

The finished appearance, weather resistance and scratch resistance were judged according to the following four-point scale: O: excellent ⊚: good Δ: fair x : poor

TABLE 4

| Thermosetting resin composition | Ex.14 (1) | Ex.15 (2) | Ex.16 (3) | Ex.17 (5) | Ex.18 (9) | Ex.19 (10) | Ex.20 (11) | C.Ex.4 C. (1) |
|---|---|---|---|---|---|---|---|---|
| Pencil hardness test | H | H | H | 2H | H-2H | 2H | 2H | F |
| Gloss (60°) | 95.0 | 95.0 | 89.0 | 94.0 | 91.0 | 90.0 | 95.0 | 85.0 |
| Finished appearance | ⊚ | ⊚ | O | ⊚ | ⊚ | Δ | ⊚ | X |
| Acid resistance | ⊚ | ⊚ | ⊚ | ⊚ | ⊚ | O | ⊚ | O |
| Solvent resistance | ⊚ | ⊚ | ⊚ | ⊚ | ⊚ | ⊚ | ⊚ | O |
| Water resistance | ⊚ | ⊚ | ⊚ | ⊚ | ⊚ | X | ⊚ | Δ-X |
| Scratch resistance | ⊚ | ⊚ | ⊚ | ⊚ | ⊚ | X | ⊚ | ⊚-O |
| Weather resistance | ⊚ | ⊚ | O | ⊚ | ⊚ | O | ⊚ | Δ-X |
| Storage stability | ⊚ | ⊚ | ⊚ | ⊚ | ⊚ | Δ-X | X | X | by Esso Corporation) and 50 parts of "Solvesso #150" (a product by Esso Corporation) so that the diluted solution showed a viscosity determined using Ford Cup #4 of 25 sec. at 20° C.

In the examinations for the film properties listed in Tables 4 and 5, the methods and the judge scales are as follows:

[Storage stability]
The examination was carried out in the same manner as described above.

[Acid resistance]
A 40%-aqueous sulfuric acid was dropped on a film to be tested and then the film was allowed to stand at 50° C. for two hours for its surface to be observed. The condition of the film surface was judged according to the following three-point scale: ⊚: no change being observed O: a slight trace of the drop being observed x : a clear trace of the drop being observed

[Water resistance]
The surface of a film to be tested was observed after being dipped into hot water of 40° C. for 10 days. The condition of the film surface was judged according to the following threepoint scale: O: no change being observed O: a slight fog being observed x : blistering being observed over the whole surface

[Solvent resistance]
The surface of a film to be tested was observed after being dipped into gasoline at room temperature for 60 minutes. The condition of the film surface was judged according to the following three-point scale: O: no change being observed O: fog being observed x : film being dissolved to disappear

[Pencil hardness]
A film to be tested was subjected to the pencil scratching test according to JIS K5400.

Examples 21 to 26 and Comparative Example 5

The thermosetting resin compositions (6) to (8), (4), (12) and (13) and the comparative thermosetting resin composition (2) given by Examples 6 to 8, 4, 12 and 13 and Comparative Example 2, respectively, were selected as samples to be examined. To each of these compositions, titanium dioxide "CR-95" (a product by Ishihara Sangyo Co., Ltd.) was blended in such an amount that the pigment content in the solid content of the resin became 40 wt %, and the mixture was kneaded using a ball mill. To the resultant, "BYK-300" (a product by BY K-Chemic Japan K.K.) and "Tinuvin 900" (a product by Ciba-Geigy Japan Limited) were further added in amounts of 0.1 wt % and 2.0 wt %, respectively, based on the solid content of the resin, and the mixture was stirred. Subsequently, the resultant was diluted with a mixed solvent of 50 parts of "Solvesso #100" (a product by Esso Corporation) and 50 parts of "Solvesso #150" (a product by Esso Corporation) so that the diluted solution showed a viscosity determined using Ford Cup #4 of 25 sec. at 20° C.; whereby a solid color coating was obtained.

Example 27

To the thermosetting resin composition (6) given by Example 6, titanium dioxide "CR-95" (a product by Ishihara Sangyo Co., Ltd.) was added in such an amount that the pigment content in the solid content of the resin became 40 wt %, and the mixture was kneaded using a ball mill. To the resultant, "BYK-300" (a product by BYK-Chemie Japan K.K.), "Tinuvin 900" (a product by Ciba-Geigy Japan Limited) and benzyltriphosphonium chloride (a curing catalyst) were further added in amounts of 0.1 wt %, 2.0 wt % and 0.5 wt %, respectively, based on the solid content of the resin, and the mixture was stirred. Subsequently, the resultant was diluted with a mixed solvent of 50 parts of "Solvesso #100" (a product by Esso Corporation) and 50 parts of "Solvesso #150" (a product by Esso Corporation) so that the diluted solution showed a viscosity determined using Ford Cup #4 of 25 sec. at 20° C.; whereby a solid color coating could be given.

On a mild steel plate [JIS G-3141 (SPCC-SB)] which had been treated with zinc phosphate and then subjected to electro-depositting process and intermediate coating process, the solid color coating was applied (the cured film thickness: 40 μm), and then heated at 140° C. for 20 minutes to prepare a film to be examined. The results of the examinations for various properties of the film are shown in Table 5.

TABLE 5

| Thermosetting resin composition | Ex.21 (6) | Ex.22 (7) | Ex.23 (8) | Ex.24 (4) | Ex.25 (12) | Ex.26 (13) | Ex.27 (6) | C.Ex.5 C. (2) |
|---|---|---|---|---|---|---|---|---|
| Pencil hardness test | H | 2H | 2H | H-2H | 2H | 2H | 2H | HB |
| Gloss (60°) | 93.0 | 92.0 | 94.0 | 89.0 | 94.0 | 94.0 | 93.0 | 95.0 |
| Finished appearance | ⊚ | ⊚ | ⊚ | ◯ | ⊚ | ⊚ | ⊚ | Δ |
| Acid resistance | ⊚ | ⊚ | ⊚ | ⊚ | ⊚ | ⊚ | ⊚ | X |
| Solvent resistance | ⊚ | ⊚ | ⊚ | ⊚ | ⊚ | ⊚ | ⊚ | X |
| Water resistance | ⊚ | ⊚ | ⊚ | ⊚ | ⊚ | ⊚ | ⊚ | X |
| Scratch resistance | ⊚ | ⊚ | ⊚ | ⊚ | ⊚ | ⊚ | ⊚ | Δ |
| Weather resistance | ⊚ | ⊚ | ⊚ | ◯ | ⊚ | ⊚ | ⊚ | Δ |
| Storage stability | ⊚ | ⊚ | ⊚ | ◯ | Δ-X | Δ-X | ◯ | ◯ |

As shown in Table 5, the coatings prepared by using the thermosetting resin composition according to the present invention exhibited excellent film properties.

Industrial Applicability

The thermosetting resin composition of the present invention exhibits a sufficient stability even when it is stored as a one-part type composition, and can form a stiff cured film rapidly at low temperature in the curing process. The resultant film exhibits excellent acid rain resistance, weather resistance, scratch resistance, water resistance, solvent resistance, film appearance and adhesion to a substrate to be coated. Accordingly, this resin composition is vary useful as a top coating for motor vehicle. This resin composition is also applicable as a solid color coating. In addition, this resin composition can also be used as a coil coating and coatings for household electric appliances, electric materials and other articles which arc required to be coated.

What is claimed is:

1. A thermosetting resin composition comprising:
a polymer (A) containing at least one monomer (a) selected from the group consisting of ethylenically unsaturated dicarboxylic anhydride, mono-ester thereof and mono-amide thereof as a repeating unit; and
a polymer (B) containing addition-polymerizable oxazoline (b-1) represented by the following general formula (I) and hydroxyl group-containing monomer (b-2) as repeating units:

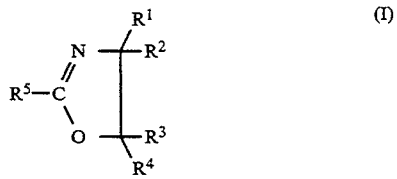

(I)

wherein $R^1$, $R^2$, $R^3$ and $R^4$ are independently hydrogen, halogen, alkyl, aralkyl, cycloalkyl, aryl or substituted aryl, $R^5$ is alkenyl or cycloalkenyl.

2. A thermosetting resin composition as claimed in claim 1, which further comprises a basic compound (C) and/or a compound (D) selected from the group consisting of a monohydric alcohol, a β-diketone represented by the following general formula (II) and an ortho-carboxylic ester:

$$R^6-\underset{\underset{O}{\|}}{C}-CH_2-\underset{\underset{O}{\|}}{C}-R^7 \qquad (II)$$

wherein $R^6$ and $R^7$ are independently alkyl or aryl.

3. The thermosetting resin composition as claimed in claim 1 or 2, wherein the polymer (A) shows an acid value of 50 to 200 mg KOH/g when all of the acid anhydride groups in said polymer (A) are monoesterified.

4. The thermosetting resin composition as claimed in claim 1 or 2, which contains said polymers (A) and (B) in such amounts that the equivalent of the oxazolinyl groups in the polymer (B) becomes 0.3 to 2.0 based on 1.0 equivalent of all carboxyl groups existent in the polymer (A) when all of the acid anhydride groups are monoesterified.

5. The thermosetting resin composition as claimed in claim 1 or 2, wherein said polymer (A) is prepared by polymerizing an ethylenically unsubstituted dicarboxylic anhydride and then monoesterifying or monoamidating a part or all of the acid anhydride groups existent in the resultant polymer.

6. The thermosetting resin composition as claimed in claim 1 or 2, wherein said polymer (B) contains said addition-polymerizable oxazoline (b-1) and said hydroxyl group-containing monomer (b-2) as the essential repeating units in such amounts that the equivalent of the hydroxyl groups becomes 0.5 to 2.0 based on 1 equivalent of the oxazolinyl groups in the polymer (B).

7. The thermosetting resin composition as claimed in claim 1 or 2, wherein said polymer (A) is a copolymer of said monomer (a) with at least one kind of alkyl(meth)acrylate and/or styrene.

8. The thermosetting resin composition as claimed in claim 1 or 2, wherein said polymer (B) is a copolymer of said addition-polymerizable oxazoline (b-1) and said hydroxyl group-containing monomer (b-2) with at least one kind of alkyl(meth)acrylate and/or styrene.

9. The thermosetting resin composition as claimed in claim 1 or 2, wherein said monomer (a) is at least one kind of monomer selected from the group consisting of dicarboxylic anhydride selected from the group consisting of maleic anhydride, itaconic anhydride and citraconic anhydride, mono-ester thereof and mono-amide thereof.

10. The thermosetting resin composition as claimed in claim 1 or 2, wherein said hydroxyl group-containing monomer (b-2) is a (meth)acrylate containing hydroxyl group.

11. The thermosetting resin composition as claimed in claim 2, wherein said basic compound (C) is an amine compound and is contained in an amount of 0.3 to 3.0 equivalents based on 1.0 equivalent of all carboxyl groups existent in said polymer (A) when all of the acid anhydride groups in the polymer (A) are monoesterified.

12. The thermosetting resin composition as claimed in claim 2, wherein said compound (D), which is at least one kind of compound selected from the group consisting of a monohydric alcohol, a β-diketone and an ortho-carboxylic ester, and is contained in an amount of not less than 1.0 equivalent based on 1.0 equivalent of all carboxyl group existent in said polymer (A) when all of the acid anhydride groups in the polymer (A) are mono-esterified.

* * * * *